United States Patent [19]
Kurosawa

[11] Patent Number: 5,870,536
[45] Date of Patent: *Feb. 9, 1999

[54] DATA CONVERSION APPARATUS AND IMAGE RECORDING APPARATUS

[75] Inventor: Yuji Kurosawa, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 877,029

[22] Filed: Jun. 17, 1997

Related U.S. Application Data

[63] Continuation of Ser. No. 677,416, Jul. 9, 1996, abandoned.

[30] Foreign Application Priority Data

Jul. 11, 1995 [JP] Japan ................................. 7-174780

[51] Int. Cl.⁶ .................................................. G06H 15/00
[52] U.S. Cl. ........................................... 315/117; 395/115
[58] Field of Search ................................ 395/102, 112, 395/115, 116, 117; 345/507, 508, 509, 510, 517, 523, 437, 439; 382/275, 277, 293, 296, 297, 298, 299

[56] References Cited

U.S. PATENT DOCUMENTS

| | | |
|---|---|---|
| 4,313,124 | 1/1982 | Hara ................................ 346/140 R |
| 4,345,262 | 8/1982 | Shirato et al. .................... 346/140 R |
| 4,459,600 | 7/1984 | Sato et al. ........................ 346/140 R |
| 4,463,359 | 7/1984 | Ayata et al. ........................... 346/1.1 |
| 4,467,448 | 8/1984 | Reyehr et al. ........................ 395/115 |
| 4,558,333 | 12/1985 | Sugitani et al. ................... 346/140 R |
| 4,608,577 | 8/1986 | Hori ................................ 346/140 R |
| 4,723,129 | 2/1988 | Endo et al. ............................ 346/1.1 |
| 4,740,796 | 4/1988 | Endo et al. ............................ 346/1.1 |
| 5,570,464 | 10/1996 | Fuse ...................................... 395/105 |

FOREIGN PATENT DOCUMENTS

| | | | |
|---|---|---|---|
| 54-056847 | 5/1979 | Japan | .................. B41M 5/26 |
| 59-123670 | 7/1984 | Japan | .................. B41J 3/04 |
| 59-138461 | 8/1984 | Japan | .................. B41J 3/04 |
| 60-071260 | 4/1985 | Japan | .................. B41J 3/04 |

*Primary Examiner*—Arthur G. Evans
*Attorney, Agent, or Firm*—Fitzpatrick, Cella Harper & Scinto

[57] ABSTRACT

After the image data transmitted via a line is received and is then stored in a predetermined zone a of a RAM. The resolution of the image data along the line is converted to the resolution of the recording means in the main-scanning direction after the image data is decoded. The converted data is then stored in a predetermined zone b of the RAM. Subsequently, the image data is read by a predetermined length (eight pixels) to reverse the arrangement of the image data in the horizontal and vertical directions while converting the resolution of the image data to the resolution of the recording means in the sub-scanning direction. The resulting data is then stored in a predetermined zone c of the RAM.

15 Claims, 12 Drawing Sheets

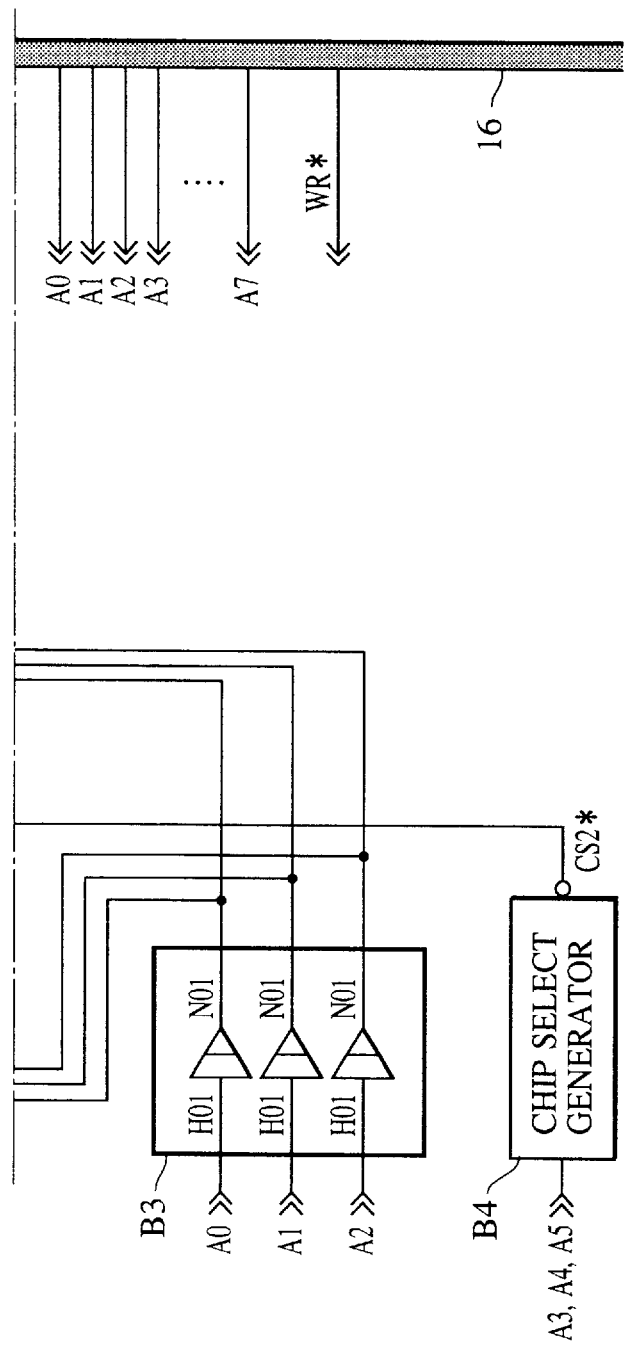

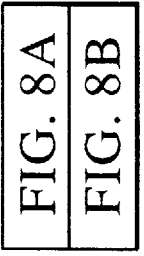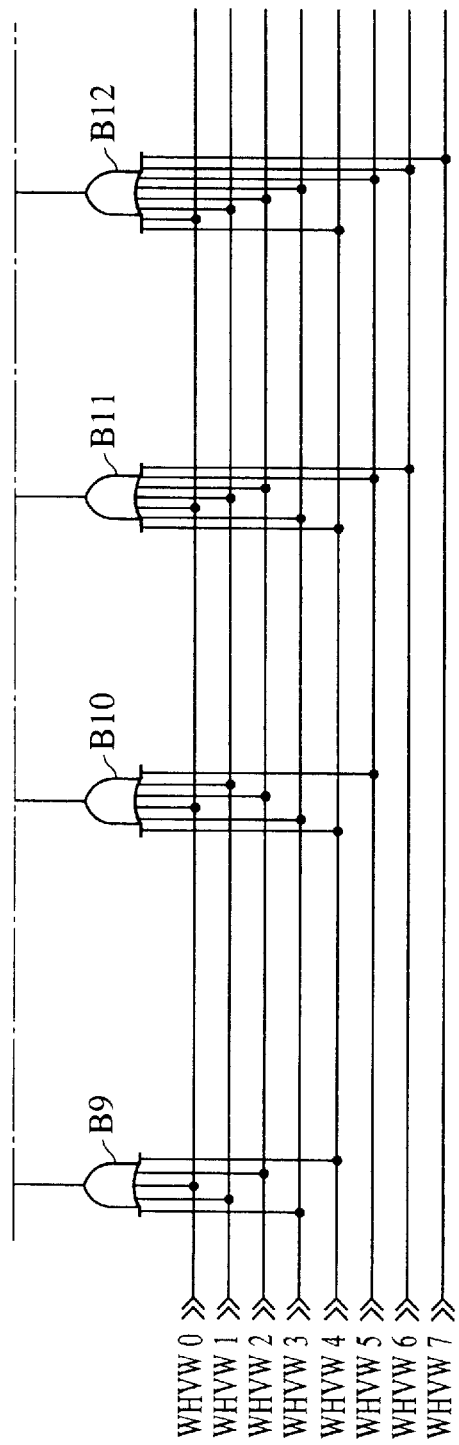
FIG. 8B

DATA CONVERSION APPARATUS AND IMAGE RECORDING APPARATUS

This application is a continuation of application Ser. No. 08/677,416 filed Jul. 9, 1996, which is now abandoned.

BACKGROUND OF THE INVENTION

1. Field of the Invention

The present invention relates to a data conversion apparatus and a recording apparatus that perform horizontal-to-vertical conversion on the arrangement of image data.

2. Description of the Related Art

Some conventional recording apparatuses employ an ink jet recording method in which ink is ejected for image formation. In this recording method, a recording head having a plurality of nozzles with a predetermined width along which a recording medium is fed is used. For carrying out the recording operation, this recording head, in general, performs scanning perpendicularly to the arrangement of the nozzles (hereinafter referred to as "the main-scanning direction), while a recording medium is fed perpendicularly to the main-scanning direction (hereinafter referred to as "the sub-scanning direction).

The resolution of the image data received by a facsimile machine having a built-in recording apparatus of the above type from other types of facsimile machines is determined to be 8 pel/mm in the main-scanning direction and 7.7 line/mm in the sub-scanning direction in compliance with, for example, the G3 fine mode. The arrangement of received image data is sometimes required to be converted prior to printing, depending on the arrangement of recording elements of the recording head (such converting processing will hereinafter be referred to as "the horizontal-to-vertical conversion" or simply referred to as "H-V conversion). Distortion would occur to the H-V converted image data output from the recording apparatus if no additional processing is executed, since the resolution of the recording apparatus usually differs from the resolution of facsimile images. For avoiding this problem, prior to the H-V conversion the resolution of the received image data in the main-scanning and sub-scanning directions is converted to the resolution which would be obtained after H-V conversion is performed.

The above-described resolution conversion and H-V conversion are performed in the following procedure. The image data in the main-scanning direction is converted in a resolution converting section built into a facsimile machine. The resulting image data is then stored in a zone of a storage medium, such as a RAM or the like. On the other hand, for enhancing the resolution of the image data in the sub-scanning direction, the data is copied line by line in another storage zone to create additional image data (data copying by a unit of line will hereinafter be referred to as "line copying" which will be described in greater detail below). Thereafter, H-V conversion is executed on the image data whose resolution is converted both in the main-scanning and sub-scanning directions.

However, the conventional facsimile machine of the above type encounters the following problems. The above-described resolution conversion and H-V conversion lengthen the time required for receiving the image data and outputting it from the recording apparatus, which decreases the total throughput of the facsimile machine. Also, memory having a large capacity is required for performing resolution conversion, which increase the size of the apparatus and costs.

SUMMARY OF THE INVENTION

Accordingly, it is an object of the present invention to provide an improved data conversion apparatus and an improved image recording apparatus.

It is another object of the present invention to provide a data conversion apparatus and an image recording apparatus in which the total throughput can be improved.

It is still another object of the present invention to provide a data conversion apparatus and an image recording apparatus which can be decreased in size and cost.

It is a further object of the present invention to provide a data conversion apparatus and an image recording apparatus in which the horizontal and vertical arrangement of the data can be reversed while performing resolution conversion on the data along the line, so that substantially simultaneous resolution conversion of the image data in the sub-scanning direction and H-V conversion of the image data can be achieved, thereby improving the total throughput.

It is a further object of the present invention to provide a data conversion apparatus and an image recording apparatus which require only a small capacity of memory for data storage, thereby decreasing the size of the apparatus and costs.

Further objects, features and advantages of the present invention will become apparent from the following description of the preferred embodiments with reference to the attached drawings.

BRIEF DESCRIPTION OF THE DRAWINGS

FIGS. 6, 6A and 6B are a circuit diagram of the H-V converting section according to the first embodiment;

FIGS. 8, 8A and 8B are a circuit diagram of the H-V converting section according to the first embodiment;

DETAILED DESCRIPTION OF THE PREFERRED EMBODIMENTS

A description will now be given of the preferred embodiments of the present invention with reference to the drawings.

Figure 1:
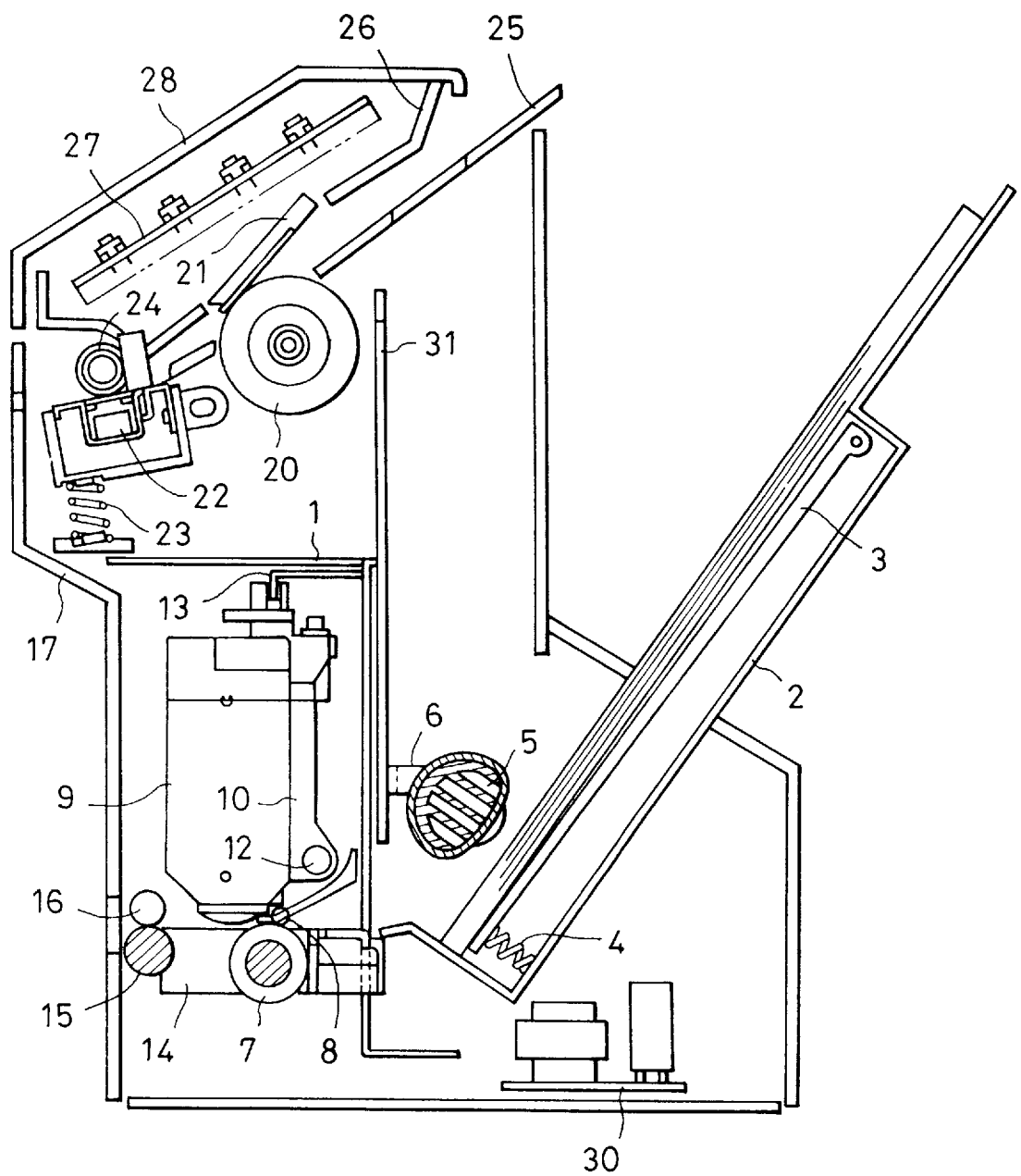
FIG. 1 is a side sectional view of the mechanical construction of a facsimile machine provided with an ink jet-type recording section according to a first embodiment of the present invention.

FIG. 1 is a side sectional view of the mechanical construction of a facsimile machine equipped with an ink-jet recording section according to the present invention through illustration of a typical embodiment. An explanation will first be given of the construction of the recording section provided for the facsimile machine. Referring to FIG. 1, the recording section includes a frame 1, which is the main element of the overall machine, an auto sheet feeder (ASF) chassis 2 fixed to the frame 1, an inside plate 3, a spring 4 for urging the inside plate 3, a recording-sheet separating roller 5 rotated clockwise in the drawing by a drive system (not shown), and a transparent sensor 6 for detecting the home position of the roller 5 (hereinafter referred to as "the roller-position sensor". The ASF chassis 2 serves as a structure of the ASF in which a plurality of recording sheets are placed and are separately fed to the recording section one by one during the recording operation. The inside plate 3 is pivoted to the ASF chassis 2 and is also urged by the spring 4 counterclockwise in the drawing.

The inside plate 3 shown in FIG. 1 is in the stand-by position after it is pivoted counterclockwise in the drawing by an inside-plate actuating cam (not shown) of the drive system. When the cam is disengaged, the inside plate 3 is pivoted clockwise and abuts against the periphery of the recording-sheet separating roller 5. The inside plate 3 is operatively associated with the position of the notches of the roller 5.

A recording-sheet feeding roller 7 is rotated counterclockwise in FIG. 1 by the drive system (not shown), and a recording-sheet feeding roller 8 is disposed to abut against the periphery of the roller 7 by a spring (not shown). The rollers 7 and 8 feed a sheet of paper to the left-hand side of FIG. 1 (hereinafter referred to as "the sub-scanning direction") while clamping it therebetween. An exchangeable (disposable)-type ink cartridge 9 integrally has an ink jet-type recording head and an ink tank for storing ink. The ink cartridge 9 is detachably carried on a carriage 10.

The recording surface of the head provided for the ink cartridge 9 is located at the bottom of the cartridge 9 and is formed by a plurality of nozzles that are arranged laterally in FIG. 1. During the recording operation, the ink cartridge 9 is moved perpendicular to the direction in which the nozzles are arranged, i.e., perpendicular to the drawing (hereinafter referred to as "the main-scanning direction"), and ink is selectively ejected from the nozzles to perform recording on an area of a recording medium corresponding to a recording width. Then, the recording sheet is fed by an amount of a recording width in the sub-scanning direction to repeat the recording operation described above. Recording is thus performed on the recording sheet. (Such a recording method is referred to as "the multi-scanning method).

Further, the carriage 10 is provided with a reflective-type photosensor (not shown) for detecting the remaining amount of ink within the ink cartridge 9. The detecting direction of this sensor is substantially the same as the reciprocating scanning direction of the ink cartridge 9. It is needless to say that the sensor, which is carried on the carriage 10, is moved together with the ink cartridge 9.

Two guide rails 12 and 13 assist in achieving a smooth reciprocating movement of the carriage 10 in the main-scanning direction. The carriage 10 is movably mounted on the rails 12 and 13 in the main-scanning direction so as to be caused to reciprocate by the drive system (not shown). A platen 14, opposedly facing the recording head, reliably allows a recording sheet to face the head across a distance between the sheet and the head in the recording position. A discharge roller 16 is urged relative to a discharge roller 15 by a pressing member (not shown), and a recording sheet is discharged through the rollers 15 and 16 while being clamped therebetween. A recording-sheet cover 17 is pivoted at its bottom to be opened for the replacement of the ink cartridge 9 or other occasions.

An explanation will now be given of the construction of the reading section of the facsimile machine. A reading document-separating roller 20 is rotated counterclockwise in the drawing by the drive system (not shown) so as to feed a plurality of sheets of documents one by one on the left-hand side of FIG. 1. A highly-frictional document-separating strip 21, such as rubber or the like, is urged against the separating roller 20 by a pressing member (not shown) so as to separate a plurality of sheets of documents one by one. A contact-type line image sensor (hereinafter simply referred to as "the image sensor") 22 serves to read an image formed on the document and converts the image information to an electric signal. The reading section further includes a contact sensor (CS) spring 23 and a white-color CS roller 24 rotated clockwise in the drawing by the drive system (not shown). The CS spring 23 is disposed to press the image sensor 22 against the CS roller 24. The CS roller 24 serves to bring the document into contact with the overall reading surface of the image sensor 22 and to feed the document on the left-hand side of FIG. 1, and further functions as a background support during the document reading operation. A document guide 25 fixed to the frame 1 to guide the bottom surface of the document doubles as a structure for supporting the reading section and an operation panel (described later). Another document guide 26 secured to the document guide 25 serves to guide the top surface of the document. An operation board 27 provided with operation switches is fixed to an operation panel 28 that is secured to the document guide 25.

A power supply 30 is formed of a power-supply transformer, a capacitor and the like. An electrical control substrate 31 is attached to the frame 1 and controls the electrical operation of the overall machine. On the substrate 31, all the lines from the components of the machine (the image sensor 22, the operation board 27, the power supply 30, the ink cartridge 9, the individual drive motors (not shown), the roller-position sensor 6, and the other sensors (not shown)) and the electric devices allocated to the individual components of the machine are connected. It should be noted that the various sensors of the reading section and a sensor for detecting the presence of recording sheets (unexplained) are directly mounted on the control substrate 31, not via lines. All the external interfaces (for example, a public switched telephone network interface, an interface for extensions attached to the base unit of the telephone, an interface for extensions connected to the external terminal, and a personal computer interface, such as the Centronics Interface) are connected on the control substrate 31.

Figure 2:
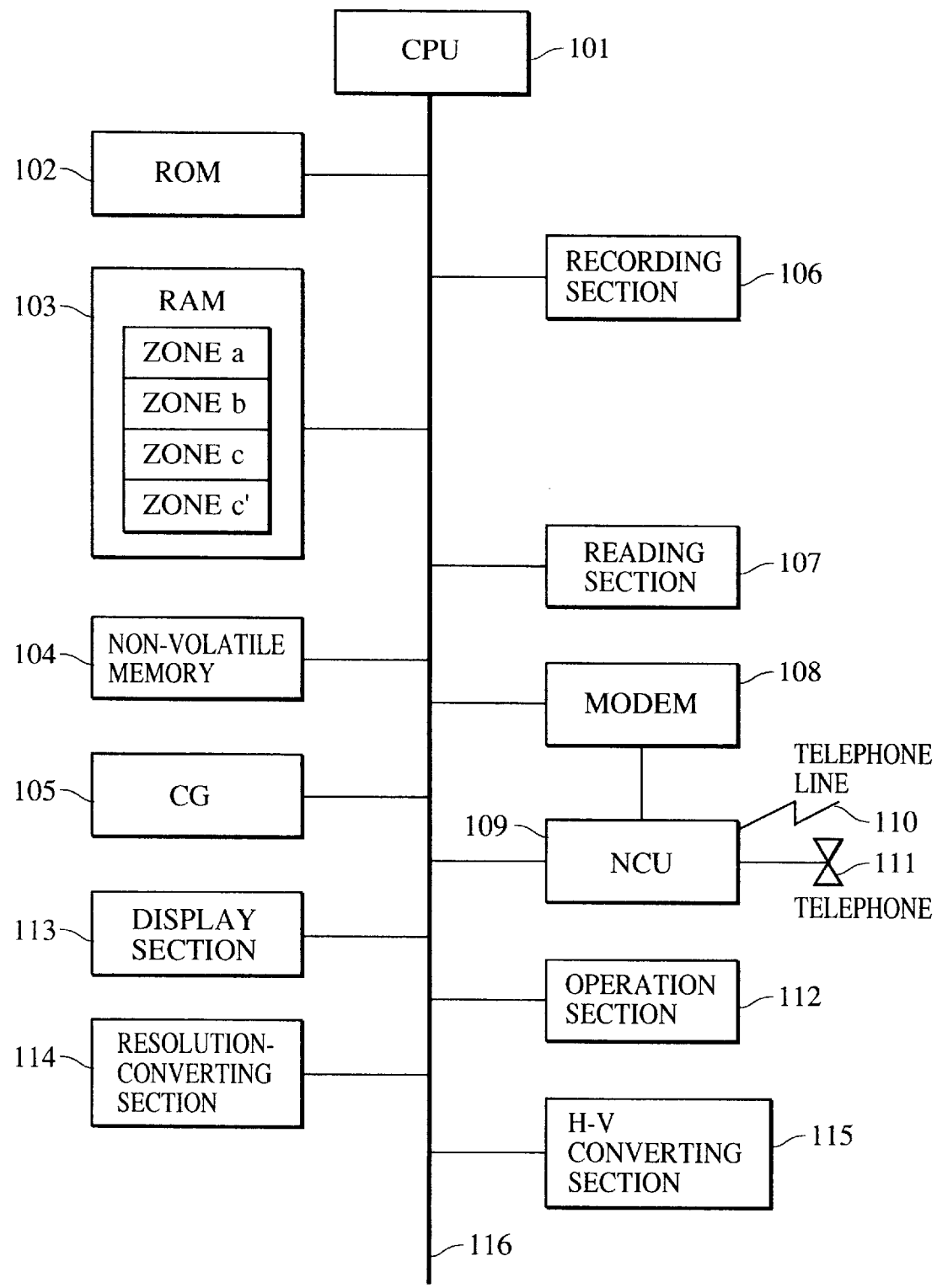
FIG. 2 is a block diagram of the electrical construction of the facsimile machine shown in FIG. 1.

FIG. 2 is a block diagram of the electrical construction of the facsimile machine whose mechanical construction is shown in FIG. 1. Referring to FIG. 2, a CPU 101 is formed of a microprocessor or the like. A ROM 102 serves to store a control program and a process program executed by the CPU 101. A RAM 103 is used as recording areas for storing image data to be transmitted and received through a facsimile machine and image data to be copied, and also serves as work areas for executing the control program and the process program by the CPU 101. A non-volatile memory 104 is formed of an EEPROM or a DRAM or an SRAM 103 having a backup power supply so that information can be stored even though power is not supplied from the power supply 30.

Further, a character generator (CG) 105 generates a character pattern according to the character code represented by a code system, such as JIS code, ASCII code or the like. Also shown are the recording section 106, the reading section 107 (both the sections have been discussed as referring to FIG. 1), a modem 108, a network control unit (NCU) 109, a telephone line 110, a telephone 111, an operation section 112 formed by part of the operation panel 28 having the described operation substrate 27, and a display section 113 formed by part of the operation panel 28 and also provided with an liquid crystal display (LCD), a light emitting device (LED), etc.

With this construction, the CPU 101 controls the ROM 102, the RAM 103, the non-volatile memory 104, the CG 105, the recording section 106, the reading section 107, the modem 108, the NCU 109, the operation section 12, and the display section 113.

The RAM 103 stores the binary image data read by the reading section 107 or the binary image data to be recorded by the recording section 106. Further, the RAM 103 stores the coded image data to be modulated by the modem 108 and output to the telephone line 110 via the NCU 109, and also stores the coded image data obtained by receiving the analog image signal via the telephone line 110 and demodulating it by the modem 108 via the NCU 109. The non-volatile memory 104 has data which should be stored regardless of the presence or the absence of a power supply (for example, an abbreviated dialing number, etc.). The CG 105 generates under the CPU 101 control character pattern data corresponding to the code that has been input as required.

The electrical system of the recording section 106, which is comprised of a direct memory access (DMA) controller, an ink cartridge 9 having an ink jet-type recording head, a CMOS logic IC, and so on, extracts the image data stored in the RAM 103 under the CPU 101 control and outputs it. On the other hand, the electrical system of the reading section 107, which is formed of a DMA controller, an image-processing IC, an image sensor, a CMOS logic IC, etc., converts the image data read by the image sensor 22 to binary data under the CPU 101 control and sequentially outputs the data to the RAM 103. It should be noted that the position of the document relative to the reading section 107 can be detected by a document detecting section (not shown) using a photosensor disposed in the document transfer passage.

In this embodiment, the conditions for the present invention are set as follows. The recording section 106 has the ink cartridge 9 equipped with 64 nozzles, and the resolution of the recording section 106 is 360 dpi both in the main-scanning and the sub-scanning directions. The nozzles are arranged in the direction perpendicular to the main-scanning direction of the ink cartridge 9. The ink cartridge 9 causes a change in the state of the ink by use of thermal energy, thereby ejecting ink droplets from the ejection openings. The image data handled in the facsimile machine is monochrome data expressed by one pixel and one bit.

The modem 108, which is constructed of a G3/G2 modem and a clock generating circuit connected to the modem, modulates the coded transmitting data stored in the RAM 103 under the CPU 101 control and outputs the data to the telephone line 110 via the NCU 109. The modem 108 also receives the analog image signal via the telephone line 110 and the NCU 109 and demodulates the signal to be converted to the coded receiving data, which is then stored in the RAM 103. The NCU 109 switches the telephone line 110 either to the modem 108 or to the telephone 111 under the CPU 101 control. Further, the NCU 109 has a detection circuit for detecting a call signal (CI), and upon detecting it, sends an incoming signal to the CPU 101.

The telephone 111, integrally formed with the main unit of the facsimile machine, has a handset, a speech network, a dialer, a ten-key numerical pad, single button keys, etc. The operation section 112 is constructed of a key for starting the image transmitting/receiving operation, a resolution-selecting key for switching the resolution of a facsimile image to the fine mode or the standard mode during the transmitting and receiving operation, a mode selection key for specifying the operation mode, such as automatic receiving mode or the like, a ten-key numerical pad and single-button keys used for dialing, and so on. The display section 113 is comprised of an LED and an LCD module formed of a combination of a 7-segment LCD used as a time display, a pictorial-character LCD for displaying the various modes, and a dot matrix LCD that is capable of displaying 5 by 7 dots (one character by one line), and the like.

A resolution-converting section 114 converts the resolution of the following data from the 8 pel/mm resolution in the main-scanning direction to the 360 dpi resolution of the recording apparatus in the main-scanning direction: the binary data that has been read by the reading section 107 and stored in a zone a (FIG. 2) of the RAM 103 and the decoded data obtained by decoding the coded receiving data that has been stored in the zone a of the RAM 103 via the telephone line 110, the NCU 109 and the modem 108. It should be noted that the resolution-converting section 114 performs resolution conversion only in the main-scanning direction on the binary data or the coded data stored in the zone a of the RAM 103, and the converted image data is stored in a zone b (FIG. 2) of the RAM 103.

After performing resolution conversion in the main-scanning direction by the resolution-converting section 114, a horizontal-vertical converting (H-V conversion) section 115 performs resolution conversion in the sub-scanning direction, simultaneously with the H-V conversion processing, in order to change the original data to the data according to the arrangement of the nozzles of the recording head provided for the ink cartridge 9 of the recording section 106. More specifically, the H-V converting section 115 converts the resolution of the binary data in the sub-scanning direction to the resolution of the recording section 106 in the sub-scanning direction, i.e. 360 dpi. Moreover, considering the recording width (64 lines) of the ink cartridge 9 in the sub-scanning direction, the H-V converting section 115 processes image data for 8 pixels along the line, i.e., 8 pixels in the sub-scanning direction at one time, and outputs the image data for 8 pixels by x lines (x indicates 8 or less), i.e., eight times, according to the process conversion ratio. More specifically, the image data for 8 pixels in the main-scanning direction and for x lines (8 lines or less) in the sub-scanning direction is first read from the zone b of the RAM 103 according to the number of nozzles (64) provided for the ink cartridge 9 of the recording section 106. The line number x of the image data (8 pixels by x lines) read from the RAM 103 is first determined so that the conversion ratio of the resolution in the sub-scanning direction can be reached. The image data (8 pixels by 8 lines) is thus created and is then rearranged to reverse the main-scanning and sub-scanning directions. Subsequently, the resulting data is output to a zone c (FIG. 2) of the RAM 103. The above-described processing is repeatedly executed on the receiving image data stored in the zone b of the RAM 103 until the recording data for one scanning operation to be performed by the ink cartridge 9 is stored in the zone c of the RAM 103. At this time, the recording operation is started.

In this embodiment, by virtue of double buffering control by the RAM 103, while performing one scanning recording operation, the H-V converted image data required for a subsequent scanning operation can be stored in an available zone c or c' (FIG. 2) of the RAM 103.

Additionally, a data bus 116 connects the above-described elements to each other.

A method for H-V conversion processing will now be explained with reference to FIGS. 3 to 9. As discussed above, H and V represent "horizontal" and "vertical", respectively. Accordingly, the H-V conversion refers to conversion from the horizontal (H) direction to the vertical (V) direction.

Figure 3:
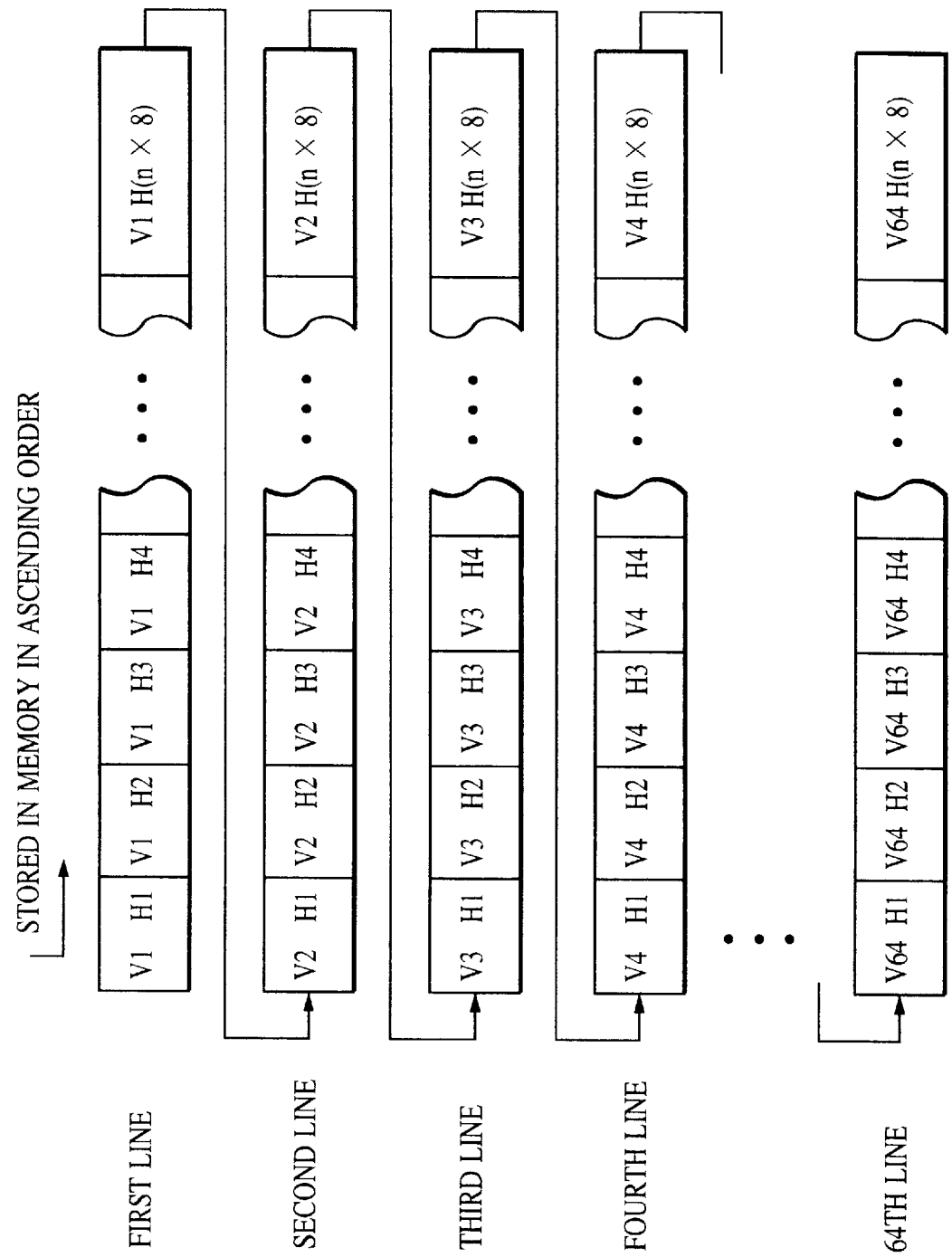
FIG. 3 illustrates the arrangement of the image data stored in the zone b of the RAM according to the first embodiment.

FIG. 3 illustrates the arrangement of the image data stored in the zone b of the RAM 103 according to a first embodiment of the present invention. As illustrated in FIG. 3, the image data for 64 lines are stored in the zone b of the RAM 103 in the following manner.

Image data at first line: V1H1, V1H2, V1H3, V1H4, . . . , V1H (n×8)
Image data at second line: V2H1, V2H2, V2H3, V2H4, . . . , V2H (n×8)
Image data at third line: V3H1, V3H2, V3H3, V3H4, . . . , V3H (n×8)
Image data at fourth line: V4H1, V4H2, V4H3, V4H4, . . . , V4H (n×8)
Image data at m-th line: VmH1, VmH2, VmH3, VmH4, . . . , VmH (n×8)

H represents the position of the column in the main-scanning direction, while v designates the position of the line in the sub-scanning direction. For example, V3H2 in FIG. 3 represents the image data located at the third line and the second column. The image data arranged along the line for 8 pixels by a predetermined number of lines, such as V1H1, V1H2, V1H3, V1H4, V1H5, V1H6, V1H7, V1H8, is first read. The data is then rearranged to be the image data for one scanning operation to be performed by the ink cartridge 9 in the horizontal direction (sub-scanning direction) and is stored in the zone c of the RAM 103. Upon storing in the zone c of the RAM 103 the image data required for one scanning operation in the main-scanning direction to be performed by the 64-nozzle ink cartridge 9, the recording operation is commenced. As discussed above, during one scanning operation, image data, i.e., the H-V converted image data, for a subsequent scanning operation can be stored in the zone c' of the RAM 103.

Figure 4:
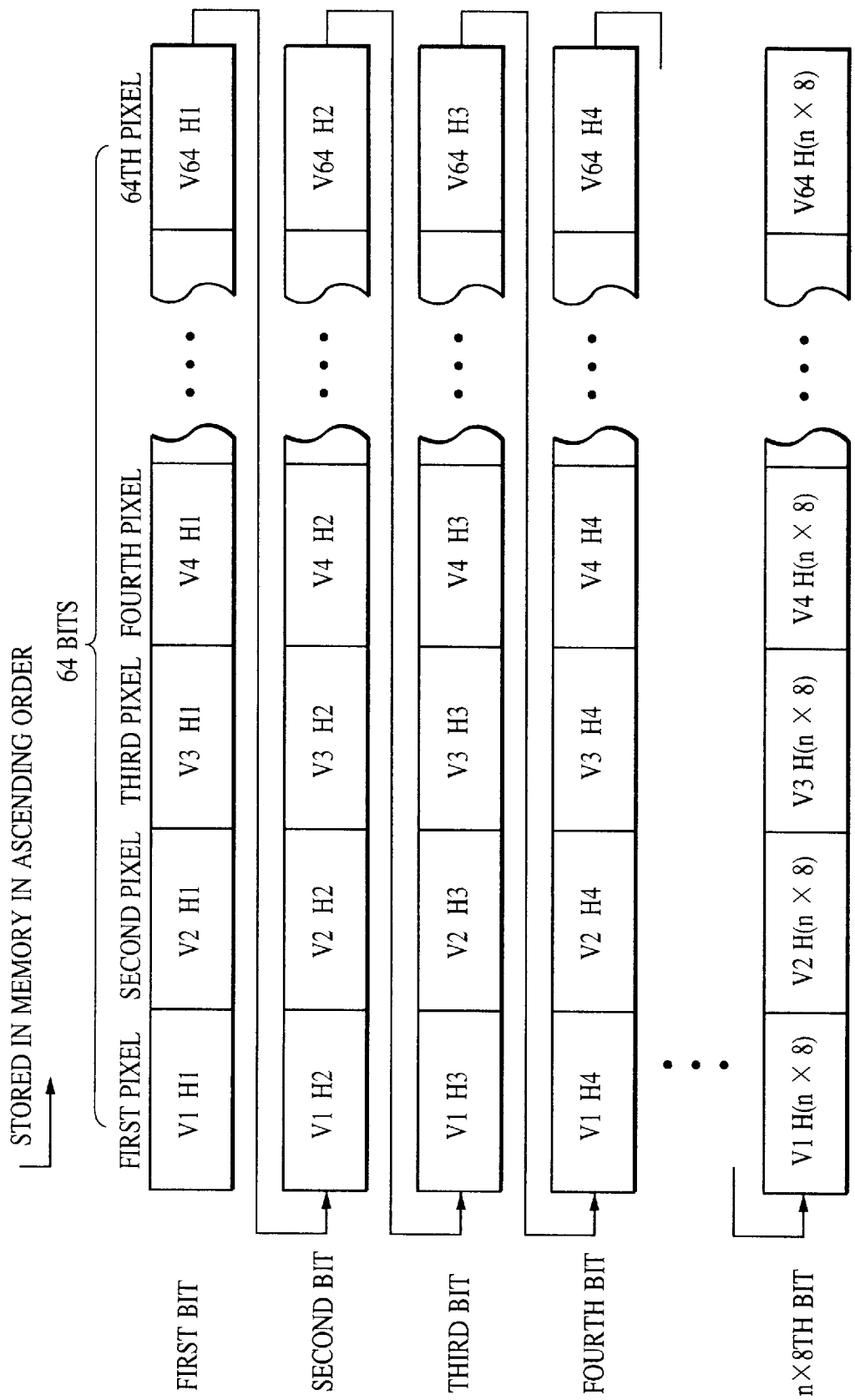
FIG. 4 illustrates the arrangement of the image data to be stored in the zone c of the RAM when line copying is not performed while performing H-V conversion according to the first embodiment.
Figure 5:
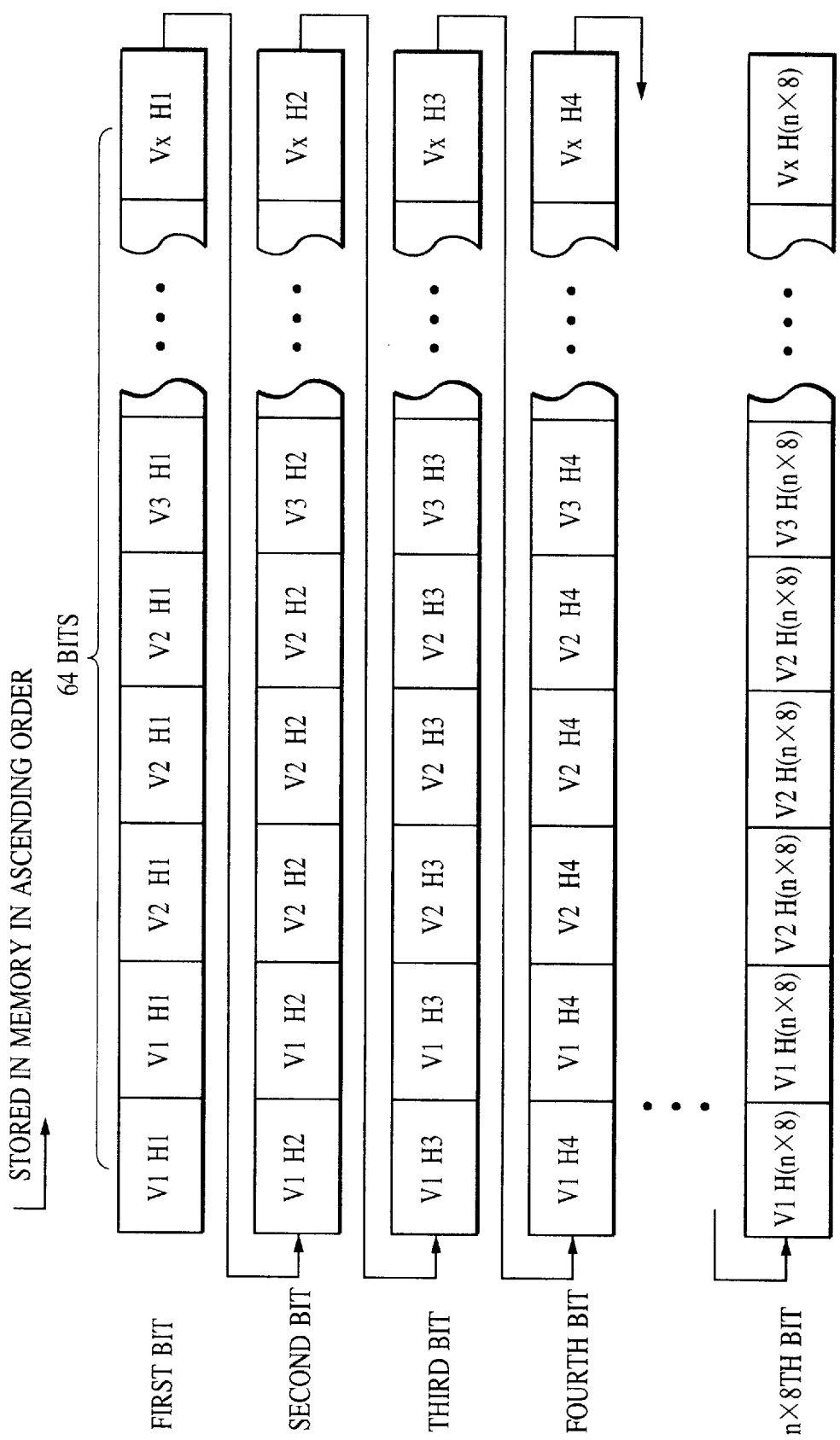
FIG. 5 illustrates the arrangement of the image data to be stored in the zone c of the RAM when line copying is performed while performing H-V conversion according to the first embodiment.

An explanation will further be given with reference to FIGS. 4 and 5 of the arrangement of the image data to be stored in the zone c of the RAM 103 after the data shown in FIG. 3 has been subjected to H-V conversion. It will be assumed that the recording head has 64 nozzles.

While conducting H-V conversion, there are the cases in which "line copying" is/is not made on the image data arranged along the line stored in the zone b of the RAM 103. The term "line copying" used herein is specified in greater detail as follows: for conducting H-V conversion of the image data arranged along the line, the image data by a unit of line stored in the zone b of the RAM 103 is copied according to the conversion ratio of the resolution in the sub-scanning direction so that the converted image data can be provided with the resolution of the recording section 106 in the longitudinal direction (sub-scanning direction).

FIG. 4 illustrates the arrangement of the image data to be stored in the zone c of the RAM 103 when "line copying" is not made on the data. For example, the image data for 8 pixels from the first pixel to the eighth pixel at the first line stored in the zone b of the RAM 103 shown in FIG. 3, such as V1H1, V1H2, V1H3, V1H4, V1H5, V1H6, V1H7, V1H8, is stored by 64 bits in the zone c of the RAM 103 starting from its leading bit, as illustrated in FIG. 4. Similarly, the image data for 8 pixels from the first pixel to the eighth pixel at the second line in the zone b of the RAM 103 is stored by 64 bits in the zone c of the RAM 103 starting from the second bit.

A description will now be given with reference to FIG. 5 of the arrangement of the image data to be stored in the zone c of the RAM 103 when "line copying" is made on the data. It will be assumed in this embodiment that the image data at the first line stored in the zone b of the RAM 103 is line-copied one time, and the image data for the subsequent line is line-copied two times. More specifically, the pixels at the first line of the image data stored in the zone b of the RAM 103 shown in FIG. 3, such as V1H1, V1H2, V1H3, . . . V1H(n×8), are line-copied one time. As a result, as shown in FIG. 5, the same data, such as V1H1, V1H2, V1H3, . . . V1H(n×8), is stored, for example, in the first and second bits, and similarly, in the 64th and 65th bits of the zone c of the RAM 103.

Subsequently, the pixels at the second line of the image data stored in the zone b of the RAM 103, such as V2H1, V2H2, V2H3, . . . V2H(n×8), are line-copied two times. As a consequence, as shown in FIG. 5, the same data, such as V2H1, V2H2, V2H3, . . . V2H(n×8), is stored, for example, in the third to the fifth bits, and likewise, in the 64+3th to the 65+3th bits of the zone c of the RAM 103. In this manner, the image data at the respective lines stored in the zone b of the RAM 103 are rearranged in the vertical and horizontal directions according to the number of line copying. The resulting data is then stored in the zone c of the RAM 103.

Figure 6A:
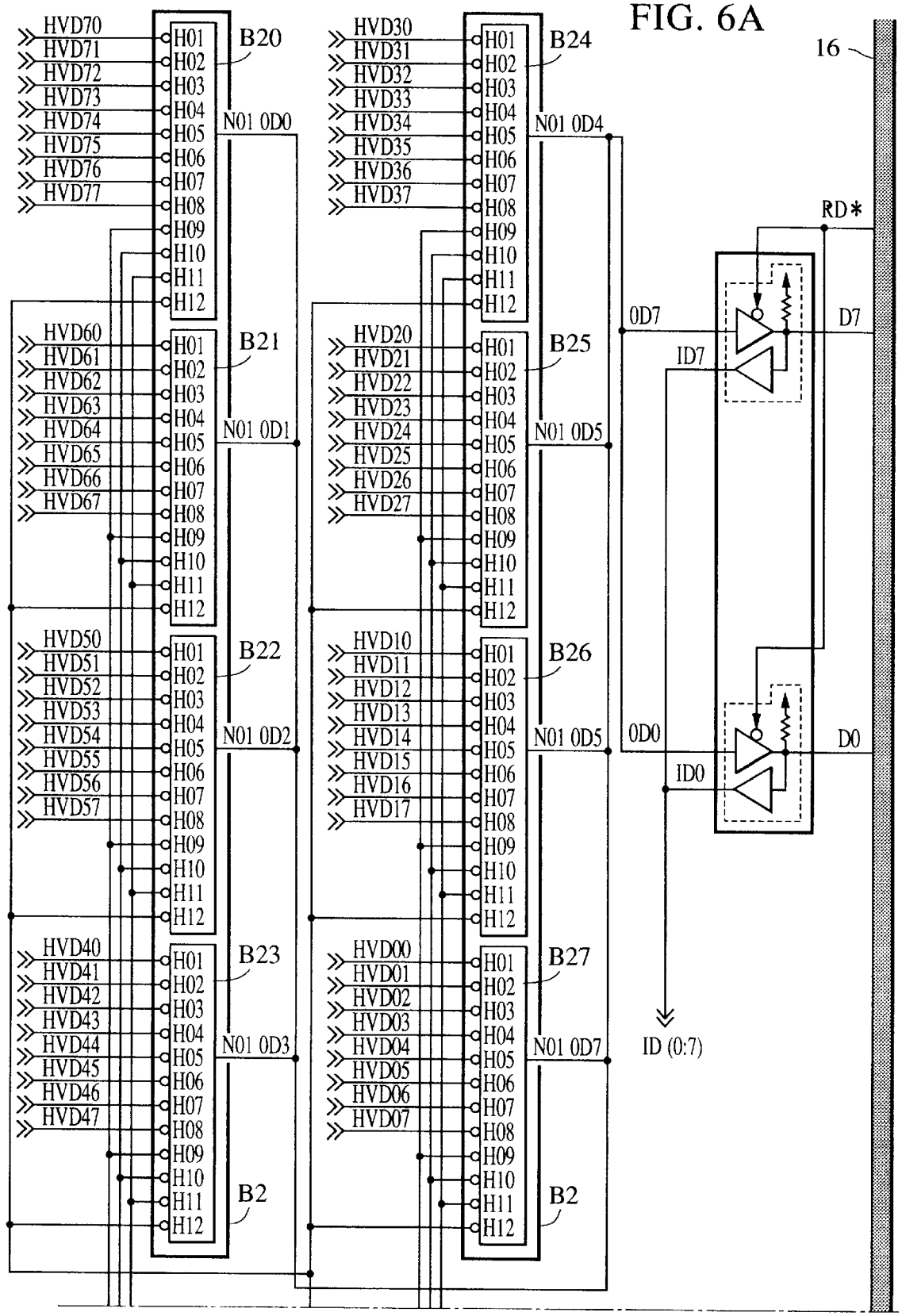

The circuit configuration of the H-V conversion section 115 will now be described with reference to FIGS. 6 to 9. FIGS. 6 to 9 illustrate the circuit configuration of the H-V conversion section 115 according to the first embodiment of the present invention. Referring to FIG. 6, an input/output buffer group B1 is formed of 8 input/output buffers. The image data for one byte at a certain line stored in the zone b of the RAM 103 is input into the buffer group B1 under the CPU 101 control, and is further input into the below-described latch circuit groups B50 to B57 shown in FIGS. 7 and 8. Upon inputting a read signal RD*, image data OD0 to OD7 is output from a selector group B2 and is further sent to the zone c of the RAM 103 from the input/output buffer group B1. The image data D0 to D7 is stored in the descending order, i.e., from D7 to D0, as the H-V converted image data, in the zone c of the RAM 103. The selector group B2 is formed of 8 selectors B20 to B27. The selectors B20 to B27 input one-bit image data sent from each of the latch circuit groups B57 to B50 and selectively output the one-bit image data according to the below-described selection signal.

It should be noted that the common 3-bit selection signal (A0, A1, A2) is input into the selectors B20 to B27. Also, input into a chip select generator B4 is a 3-bit control signal (A3, A4, A5) for instructing the generator B4 to select one of the selectors B20 to B27. The chip select generator B4 generates a chip select signal C2* according to the input control signal (A3, A4, A5), thereby selecting one of the selectors B20 to B27. On the other hand, the selector specified by the chip select signal C2* selectively inputs, according to the selection signal (A0, A1, A2), one bit of the image data that has been input into the input terminals (H01 to H08).

In this embodiment, the level of the selection signal (A1, A2, A3) is first fixed, and then, the chip select signal C2* is enabled, which also enables the selectors B20 to B27 to output the image data that has been input into the same number of the input terminals of the respective selectors B20 to B27. In this fashion, the image data OD0 to OD7 can be obtained.

Figure 7:
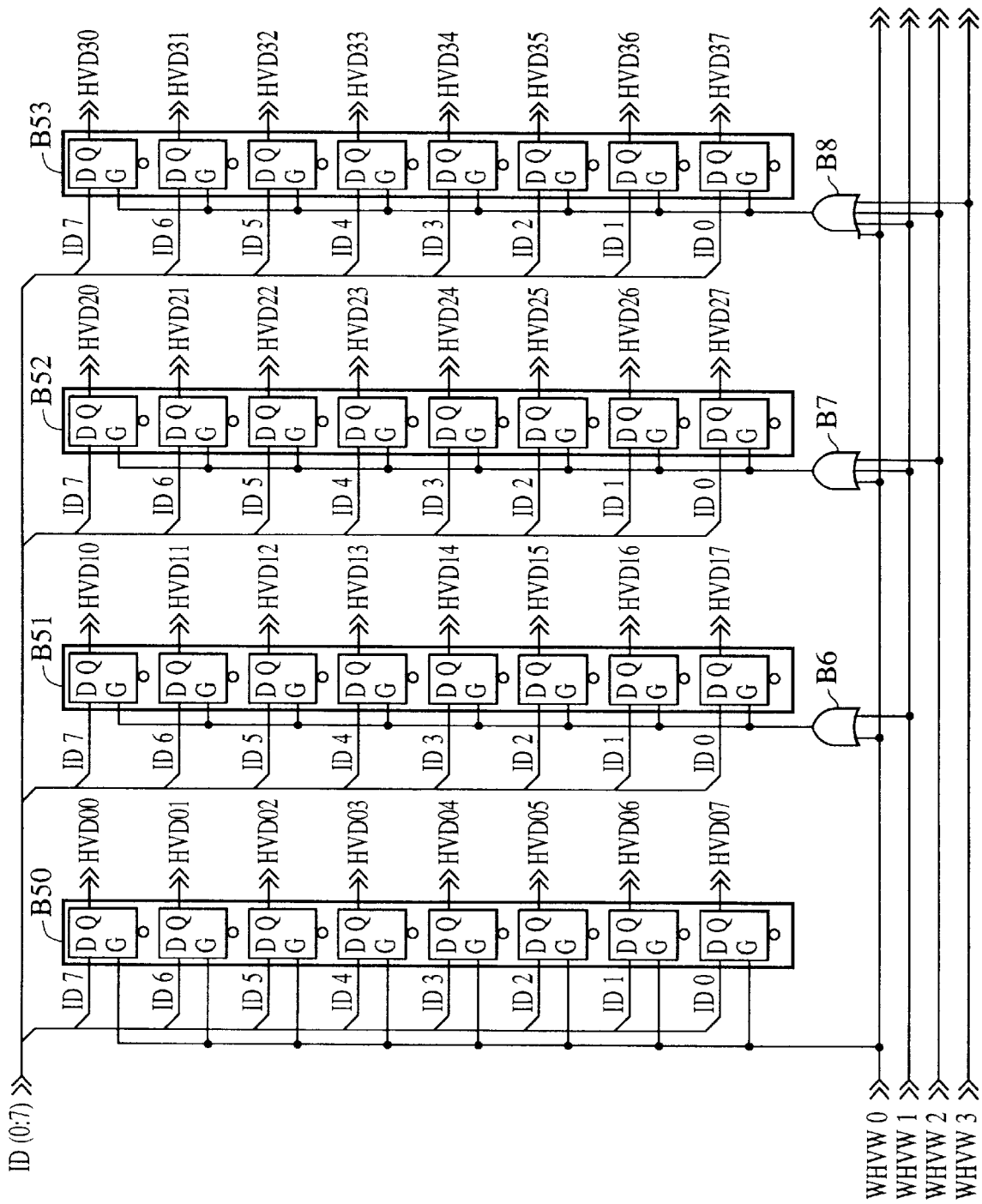
FIG. 7 is a circuit diagram of the H-V converting section according to the first embodiment.
Figure 8A:
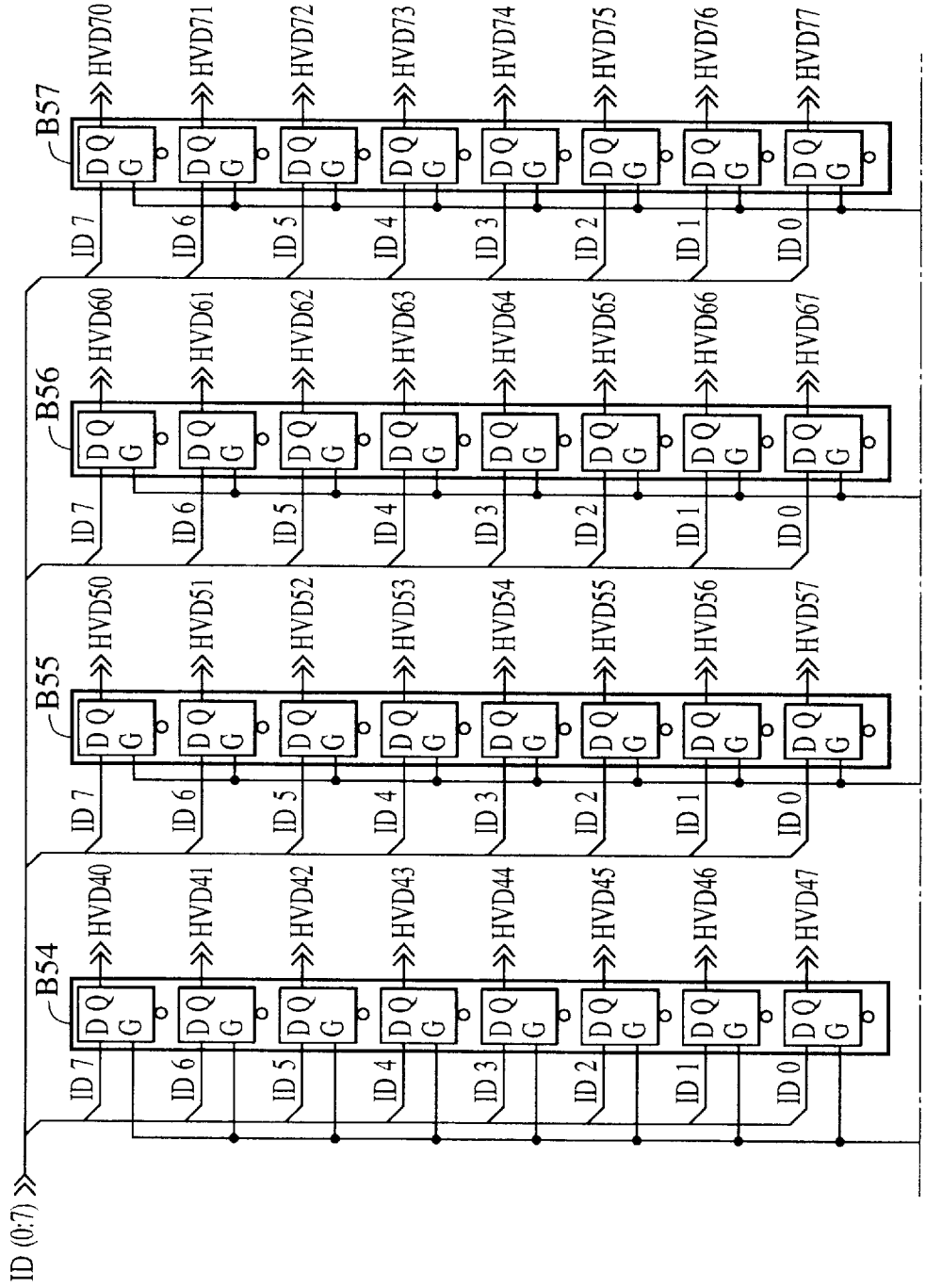
Figure 9:
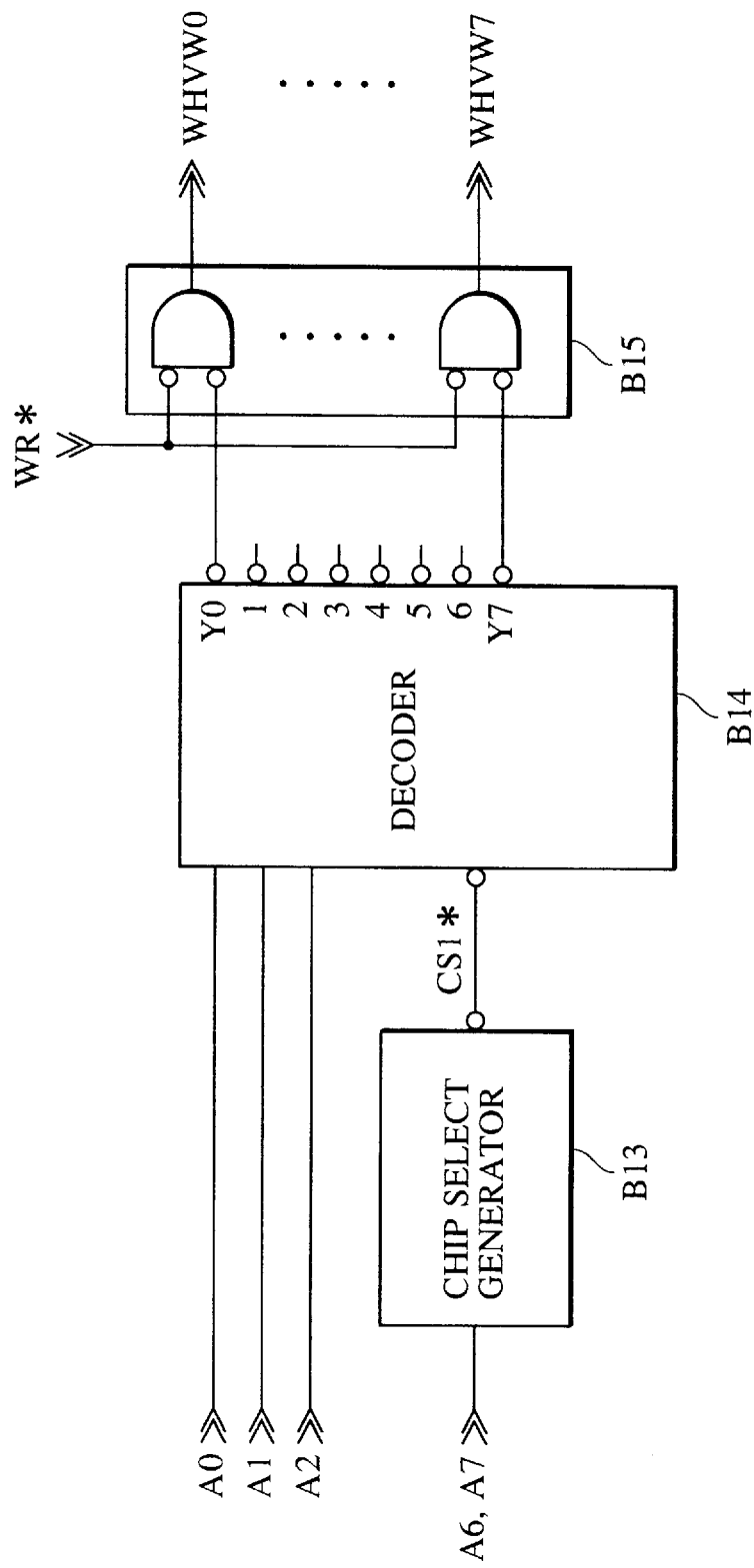
FIG. 9 is a circuit diagram of the H-V converting section according to the first embodiment.

Referring to FIGS. 7 and 8, the 8 latch circuit groups B50 to B57 are each comprised of 8 latch circuits B500 to B507, B510 to B517, B520 to B527, B530 to B537, B540 to B547, B550 to B557, B560 to B567, and B570 to B577, respectively. The respective items of image data (ID0 to ID7) are latched by the latch circuit groups B50 to B57 according to the below-described write trigger signals WHVW0 to WHVW7, respectively. For example, when the write trigger signal WHVW0 is at the high level H, (hereinafter simply referred to as "H", and the low level will be referred to as "L"), the image data input into the input/output buffer group B1 is latched in the latch circuits of the latch circuit groups B50 to B57. When the write trigger signal WHVW1 is at "H", the image data input into the input/output buffer group B1 is latched in the latch circuits of the latch circuit groups B51 to B57. Similarly, when the write trigger signal WHVW2 is at "H", the image data is latched in the latch circuits of the latch circuit groups B52 to B57 . . . , and when the write trigger signal WHVW7 is at "H", the image data is latched in the latch circuits of the latch circuit group B57. The blocks of the image data stored in the individual latch circuit groups B50 to B57 are output as the image data, HVD00 to HVD07, HVD10 to HVD17, HVD20 to HVD27, HVD30 to HVD37, HVD40 to HVD47, HVD50 to HVD57, HVD60 to HVD67, HVD70 to HVD77, respectively, according to the chip select signal CS2*, the selection signal (A0, A1, A2), and the control signal (A3, A4, A5) (both the signals will be described later). The data is further input into a predetermined selector of the selector group B2 on the basis of the relationship between the image data shown in FIGS. 6 to 8 and the corresponding output terminal.

The levels of the write trigger signals WHVW0 to WHVW7 are determined by the selection signal (A0, A1, A2) and a two-bit control signal (A6, A7) sent from the CPU 101 via the data bus 116. For example, when line copying is not performed, i.e., when resolution conversion is not carried out, the level of the control signal A6 and A7 is "L". This control signal is supplied to a chip select generator 13 shown in FIG. 9, and then, a chip select signal CS1* is enabled to output the respective bits (Y0, . . . , Y7) of a decoder B14 as data, 10000000, 01000000, 00100000 . . . , 00000001, which is then synchronized to the write signal WR*, and the write trigger signals WHVW0 to WHVW7 are thus generated in an NAND gate group B15. In this manner, the output from the decoder B14 is controlled to be synchronized to the write signal WR* in the NAND gate group B15. More specifically, every time 8-bit image data is input into the NAND gate group B15, one of the write trigger signals WHWV0 to WHVW7 becomes "H", such as the case in which WHVW0="H" and WHVW1 to WHVW7="L", the case in which WHVW0="L", WHVW1="H", and WHVW2 to WHVW7="L", and the like.

The specific operation of the described H-V converting section 115 will now be described. An explanation will be given of the two cases in which the line copying operation discussed while referring to FIGS. 4 and 5 is/is not performed.

When Line Copying is not Performed

According to the above-described control, when only the write trigger signal WHVW0 is at "H", the 8-bit image data is latched in the latch circuit group B50, and the same data is also latched in the latch circuit groups B51 to B57. When only the write trigger signal WHVW1 is at "H", a subsequently-read block of 8-bit image data is latched in the latch circuit group B51, and the same data is also latched in the latch circuit groups B52 to B57. Likewise, the write trigger signals WHVW2 to 7 sequentially become "H", and 8-bit image data is latched in the corresponding latch circuit groups. In this manner, the writing operation is repeated 8 times to latch the image data for 8 bits by 8 lines in the latch circuit groups B50 to B57.

Upon the start of H-V conversion processing, the image data from the first pixel to the eighth pixel at the first line shown in FIG. 3, such as V1H1, V1H2, V1H3, V1H4, V1H5, V1H6, V1H7, V1H8, is first input into the input/output buffer group B1 of the H-V converting section 115 under the CPU 101 control. Then, in response to the control signal A6 and A7 at "L" and the selection signal A0, A1 and A2 at "L", the write trigger signal WHVW0 at "H" and the write trigger signals WHVW1 to WHVW7 at "L"are output from the NAND gate group B15. Further, in response to the write trigger signal WHVW0 at "H", the image data, V1H1, V1H2, V1H3, V1H4, V1H5, V1H6, V1H7, V1H8, input into the input/output buffer group B1, is latched in the latch circuit groups B50 to B57. During this operation, since the write trigger signal WHVW0 at "H" is input into the OR gates B6 to B12 connected to the respective latch circuit groups B51 to B57, the image data, V1H1, V1H2, V1H3, V1H4, V1H5, V1H6, V1H7, V1H8, is also latched in the respective latch circuit groups B51 to B57.

Thereafter, the image data from the first pixel to the eighth pixel at the second line shown in FIG. 3, such as V2H1, V2H2, V2H3, V2H4, V2H5, V2H6, V2H7, V2H8, is input into the input/output buffer group B1 under the CPU 101 control. Then, in response to the control signal A6 and A7 at "L" and the selection signal A0 at "H" and A1 and A2 at "L, the write trigger signal WHVW1 at "H", the signal WHVW0 at "L", and the signals WHVW2 to WHVW7 at "L" are output from the NAND gate group B15. In response to the write trigger signal WHVW1 at "H", the image data, V2H1, V2H2, V2H3, V2H4, V2H5, V2H6, V2H7, V2H8, input into the input/output buffer group B1, is latched in the latch circuit groups B51 to B57. During this operation, since the write trigger signal WHVW1 at "H" is input into the OR gates B7 to B12 connected to the respective latch circuit groups B52 to B57, the image data, V2H1, V2H2, V2H3, V2H4, V2H5, V2H6, V2H7, V2H8, is also latched in the respective latch circuit groups B52 to B57.

Prior to the above-described latching operation of the image data at the second line, the image data from the first pixel to the eighth pixel at the first line, such as V1H1, V1H2, V1H3, V1H4, V1H5, V1H6, V1H7, V1H8, has been latched in the latch circuit groups B50 to B57. However, the above-mentioned data is completely erased when the image data from the first pixel to the eighth pixel at the second line, such as V2H1, V2H2, V2H3, V2H4, V2H5, V2H6, V2H7, V2H8, is input into the latch circuit groups B51 to B57 in response to the write trigger signal WHVW1 at "H".

Similarly, when the write trigger signal WHVW2 at "H" is output, the image data from the first pixel to the eighth pixel at the third line, such as V3H1, V3H2, V3H3, V3H4, V3H5, V3H6, V3H7, V3H8, is latched in the latch circuit groups B52 to B57. Subsequently, in response to the output of the write trigger signal WHVW3 at "H", the image data from the first pixel to the eighth pixel at the fourth line, such as V4H1, V4H2, V4H3, V4H4, V4H5, V4H6, V4H7, V4H8, is latched in the latch circuit groups B53 to B57. The above-described operation is repeated until the write trigger signal WHVW7 at "H" is output. As a result, the image data for 8 pixels at the first line is latched in the latch circuit group B50; the image data at the second line is latched in the latch circuit group B51; the image data at the third line is latched in the latch circuit group B52; the image data at the fourth line is latched in the latch circuit group B53; the image data at the fifth line is latched in the latch circuit group B54; the image data at the sixth line is latched in the latch circuit group B55; the image data at the seventh line is latched in the latch circuit group B56; and the image data at the eighth line is latched in the latch circuit group B57.

After the image data for 8 bits by 8 lines is latched in this manner, the CPU 101 supplies the control signal (A3, A4, A5) and the selection signal (A0, A1, A2) to control the output of the data to the input/output buffer group B1 using the selectors B20 to B27. More specifically, the selection signal (A0, A1, A2) is first set at "L", and the chip select signal CS2* selects the selectors B20, B21 . . . , B27 which then output data V8H1, V7H1, V6H1, V5H1, V4H1, V3H1, V2H1, V1H1, respectively, i.e., the image data for a total of 8 bits is output to the input/output buffer group B1. Then, the image data is read from the input/output buffer group B1 according to the read signal RD* and is then stored in the zone c of the RAM 103 starting from the leading bit in the order of V1H1, V2H1, V3H1, V4H1, V5H1, V6H1, V7H1, V8H1, as shown in FIG. 4.

Thereafter, the selection signal A0 is set at "H" and A1 and A2 set at "L", and the chip select signal CS2* selects the selectors B20 to B27 which then output V8H2, V7H2, V6H2, V5H2, V4H2, V3H2, V2H2, V1H2, respectively. The selected image data is read from the input/output buffer group B1 and is then stored in the zone c of the RAM 103 starting from the 65th bit, in the order of V1H2, V2H2, V3H2, V4H2, V5H2, V6H2, V7H2, V8H2, as shown in FIG. 4. Similarly, blocks of the image data by 8 bits are output from the selectors B20 to B27 and are sequentially stored in the zone c of the RAM 103 by 64 bits starting from the leading bit.

The above-described processing is also executed by the H-V converting section 115 on the image data from the first pixel to the eighth pixel at the 9th to the 16th lines stored in the zone b of the RAM 103. Thus, the blocks of the image data are sequentially stored by 64 bits in the zone c of the RAM 103 starting from the 9th bit to the 16th bit. In this manner, H-V conversion processing is executed on the image data at the respective lines up to the 64th line. As a consequence, the image data can be stored in the zone c of the RAM 103 starting from the leading bit to the 512nd bit (64 bits by 8).

Thereafter, H-V conversion processing is executed on the 8-bit image data from the 9th pixel to the 16th pixel at the respective lines stored in the zone b of the RAM 103. The image data is thus stored in the zone c of the RAM 103 starting from the 513rd bit to the 1024th bit.

The above-described processing is repeated until the time when the image data required for one scanning operation to be carried out by the recording section (in an amount equal to the 64 nozzles by the number of main-scanning bits) is stored in the zone c of the RAM 103. Then, the ink cartridge 9 performs one scanning operation to record on the recording paper. Thereafter, every time the image data (the 64 nozzles by the number of main-scanning bits) is stored in the zone c of the RAM 103, the ink cartridge 9 performs one scanning operation. In this fashion, the image data stored in the zone b of the RAM 103 completely undergoes the above-described processing. Hence, the H-V converted and resolution-converted image data can be recorded on recording paper.

During this converting operation, the double buffering control discussed earlier may be performed by use of both zones c and c' of the RAM 103. More specifically, while the recording section performs one scanning operation in either of the zone c or c', the other zone may be used for storing the data for a subsequent scanning operation. Accordingly, H-V conversion and resolution conversion may be performed in an available buffer while recording is performed in the other buffer.

The CPU 101 constantly monitors the arrangement of the image data stored in the zone b of the RAM 103, the arrangement of the image data latched in the H-V converting section 115, and the arrangement of the image data stored in the zone c of the RAM 103. The CPU 101 thus exerts control over the output of the selection signal and the control signal according to the abovementioned data arrangements so as to read/store the image data.

When Line Copying is Performed

The number of line copying operations is determined by the resolution of the receiving image data. In this embodiment, in accordance with the resolution 360 dpi of the recording section 106 in the main-scanning direction, the line copying operation will be performed in the following manner under the CPU 101 control on the receiving image data at each line (with resolution 7.7/mm) in compliance with the G3 standards. The image data at the first line stored in the zone b of the RAM 103 is copied one time; the data at the second line is copied two times; and the data at the third line is copied two times. Thereafter, when j is an integer, the 3$j$-2 th line is copied one time; the 3$j$-1 th line is copied two times; and 3$j$ th line is copied two times. Accordingly, the resulting image data can be provided with the resolution of the recording section 106. However, the copying operation in the above-described manner is not exclusive in the present invention. For example, the 3$j$-2 th line may be copied two times; 3$j$-1 th line may be copied two times; and the 3$j$ th line may be copied one time. Namely, the line copying operation should be performed in such a manner that a desired conversion ratio can be achieved.

In this embodiment, the line copying operation is performed on the image data stored in the RAM 103 shown in FIG. 3 in the following manner: the data at the first line is copied one time; the data at the second line is copied two times; the data at the third line is copied two times; and thereafter, when j is a positive integer, the 3$j$-2 th line is copied one time; the 3$j$-1 th line is copied two times; and the 3$j$ th line is copied two times. As a consequence, the resulting image data can be provided with the resolution of the recording section 106 in the main-scanning direction.

When the line copying operation, i.e., the resolution conversion, is performed under the above-described conditions, the control signal A6 and A7 is set at "L", which makes the chip select signal CS1* active. At the same time, the control signal A0, A1, A2 is manipulated so that the respective bits (Y0, . . . , Y7) of the decoder B14 are synchronized to the write signal WR* and are then output as data 10000000, 00100000, 00000100. In this manner, the output from the decoder B14 is controlled to be synchronized to the write signal WR* in the NAND gate group B15. More specifically, every time 8-bit image data is input into the NAND gate group B15, one of the write trigger signals WHWV0 to WHVW7 becomes "H", such as {WHVW0="H" and WHVW1 to WHVW7="L"}, {WHVW0 and WHVW1="L", WHVW2="H", and WHVW3 to WHVW7="L"}, {WHVW0 to WHVW4="L", WHVW5="H", and WHVW6 and WHVW7="L"}, and the like.

According to the above-described control operation, when only the write trigger signal WHVW0 is at "H", the 8-bit image data is latched in the latch circuit group B50, and the same data is also latched in the latch circuit groups B51 to B57. When only the signal WHVW2 is at "H", the subsequently-read 8-bit image data is latched in the latch circuit group B52, and the same data is also latched in the latch circuit groups B53 to B57. Further, when only the signal WHVW5 is at "H", the subsequently-read 8-bit image data is latched in the latch circuit group B55, and the same data is latched in the latch circuit groups B56 and B57. In this manner, the writing operation is performed three times, and then, the image data for 8 bits by 8 lines including one copied image data at a first line, two copied image data at a subsequent line, and two copied image data at a further subsequent line, can be latched in the latch circuit groups B50 to B57.

Upon the start of H-V conversion processing, the image data from the first pixel to the eighth pixel at the first line shown in FIG. 3, such as V1H1, V1H2, V1H3, V1H4, V1H5, V1H6, V1H7, V1H8, is input into the input/output buffer group B1 of the H-V converting section 115 under the CPU 101 control. Then, in response to the control signal A6 and A7 at "L" and the selection signal A0, A1 and A2 at "L", the write trigger signal WHVW0 at "H" and the write trigger signals WHVW1 to WHVW7 at "L"are output from the NAND gate group B15. Further, in response to the signal WHVW0 at "H", the image data input into the input/output buffer group B1, such as V1H1, V1H2, V1H3, V1H4, V1H5, V1H6, V1H7, V1H8, is latched in the latch circuit groups B50 to B57. During this operation, since the signal WHVW0 at "H" is input into the OR gates B6 to B12 connected to the latch circuit groups B51 to B57, respectively, the image data is also latched in the latch circuit groups B51 to B57, as well as in the latch circuit group B50.

Subsequently, the image data from the first pixel to the eighth pixel at the second line, such as V2H1, V2H2, V2H3, V2H4, V2H5, V2H6, V2H7, V2H8, is input into the input/output buffer group B1 under the CPU 101 control. Then, in response to the control signal A6 and A7 at "L" and the selection signal A0 at "L", A1 at "H", and A2 at "L", the write trigger signal WHVW2 at "H", WHVW0 and WHVW1 at "L" and WHVW3 to WHVW7 at "L" are output from the NAND gate group B15. Further, in response to the write trigger signal WHVW2 at "H", the image data, V2H1, V2H2, V2H3, V2H4, V2H5, V2H6, V2H7, V2H8, input into the input/output buffer group B1, is latched in the latch circuit groups B52 to B57. During this operation, since the signal WHVW2 at "H" is input into the OR gates B7 to B12 connected to the latch circuit groups B52 to B57, respectively, the image data is latched in the latch circuit groups B52 to B57.

Prior to the above-described latching operation of the image data at the second line, the image data at the first line, such as V1H1, V1H2, V1H3, V1H4, V1H5, V1H6, V1H7, V1H8, has been latched in the latch circuit groups B50 to B57. However, the above-mentioned data is completely erased when the image data at the second line, such as V2H1, V2H2, V2H3, V2H4, V2H5, V2H6, V2H7, V2H8, is input into the latch circuit groups B52 to B57 in response to the write trigger signal WHVW2 at "H". Accordingly, when the line copying operation is performed, it is necessary to ensure latch circuits for latching copied image data. Thus, control is executed to cause the write trigger signal at "H"according to the number of copying operations, so that the image data at the first line can remain as the copied image data in the latch circuit groups B50 and B51.

Similarly, when the write trigger signal WHVW5 at "H" is output, the image data from the first pixel to the eighth pixel at the third line, such as V3H1, V3H2, V3H3, V3H4, V3H5, V3H6, V3H7, V3H8, is stored in the latch circuit groups B55 to B57.

As a result, the image data for 8 pixels at the first line is latched in the latch circuit groups B50 and B51; the image data for 8 pixels at the second line is latched in the latch circuit groups B52 to B54; and the image data for 8 pixels at the third line is latched in the latch circuit groups B55 to B57.

After the image data for 8 bits by 3 lines is latched, the CPU 101 supplies the control signal (A3, A4, A5) and the selection signal (A0, A1, A2) so as to control the output of the data to the input/output buffer group B1 using the selectors B20 to B27. More specifically, the selection signal (A0, A1, A2) is first set at "L", and the chip select signal CS2* selects the selectors B20, B21 . . . , B27 which then output data V8H1, V7H1, V6H1, V5H1, V4H1, V3H1, V2H1, V1H1, respectively, i.e., the image data for a total of 8 bits is output to the input/output buffer group B1. Then, the image data is read from the input/output buffer group B1 according to the read signal RD* and is then stored in the zone c of the RAM 103 starting from the leading bit in the order of V1H1, V2H1, V3H1, V4H1, V5H1, V6H1, V7H1, V8H1, as shown in FIG. 4.

Subsequently, the selection signal A0 is set at "H" and A1 and A2 at "L", and the chip select signal CS2* selects the selectors B20, B21, . . . , B27, which then output the image data, V8H2, V7H2, V6H2, V5H2, V4H2, V3H2, V2H2, V1H2, respectively. The selected data is read from the output buffer group B1 according to the read signal RD*, and is stored in the zone c of the RAM 103 in the order of V1H2, V2H2, V3H2, V4H2, V5H2, V6H2, V7H2, V8H2, as shown in FIG. 4.

Thereafter, similarly, blocks of the image data by 8 bits are output from the selectors B20 to B27, and are then sequentially stored in the zone c of the RAM 103 by 64 bits starting from the leading bit.

The above-described processing is also executed by the H-V converting section 115 on the image data from the first pixel to the eighth pixel at the fourth to the sixth lines stored in the zone b of the RAM 103. Thus, the blocks of the image data are sequentially stored by 64 bits in the zone c of the RAM 103 starting from the 9th bit to the 16th bit. In this manner, H-V conversion processing is executed on the image data at the respective lines up to the 24th line. As a consequence, the image data can be stored in the zone c of the RAM 103 starting from the leading bit to the 512nd bit (64 bits by 8).

Thereafter, H-V conversion processing is executed on the 8-bit image data from the 9th pixel to the 16th pixel at the respective lines stored in the zone b of the RAM 103. The image data is thus stored in the zone c of the RAM 103 starting from the 513rd bit to the 1024th bit.

The above-described processing is repeated until the time when the image data required for one scanning operation to be carried out by the recording section (in an amount equal to the 64 nozzles by the number of main-scanning bits) is stored in the zone c of the RAM 103. Then, the ink cartridge 9 performs one scanning operation to record on the recording paper. Thereafter, every time the image data (the 64 nozzles by the number of main-scanning bits) is stored in the zone c of the RAM 103, the ink cartridge 9 performs one scanning operation. In this fashion, the image data stored in the zone b of the RAM 103 completely undergoes the above-described processing. Hence, the H-V converted and resolution-converted image data can be recorded on recording paper.

As has been discussed above, according to the first embodiment, copied image data can be obtained at high rate without requiring the conventional line copying operation. Also, the image data to be latched in the latch circuit groups B50 to B57 is controlled, whereby the line copying operation can be performed while H-V conversion processing is executed. As a consequence, line copying and H-V conversion, which are separately performed conventionally, can be performed at the same time, thereby improving the total throughput of the apparatus. Additionally, during the line copying operation, a buffer is no longer required for copied images, which lead to a decrease in the required memory capacity. This further decreases the circuitry size and the manufacturing costs.

A second embodiment of the present invention will now be explained. In the first embodiment, H-V conversion is executed on image data under the CPU 101 control by a unit of at a maximum of 8 bits by 8 lines. In this embodiment, resolution conversion and H-V conversion are preformed by a unit of one line by means of direct memory access (DMA) transfer.

Figure 10:
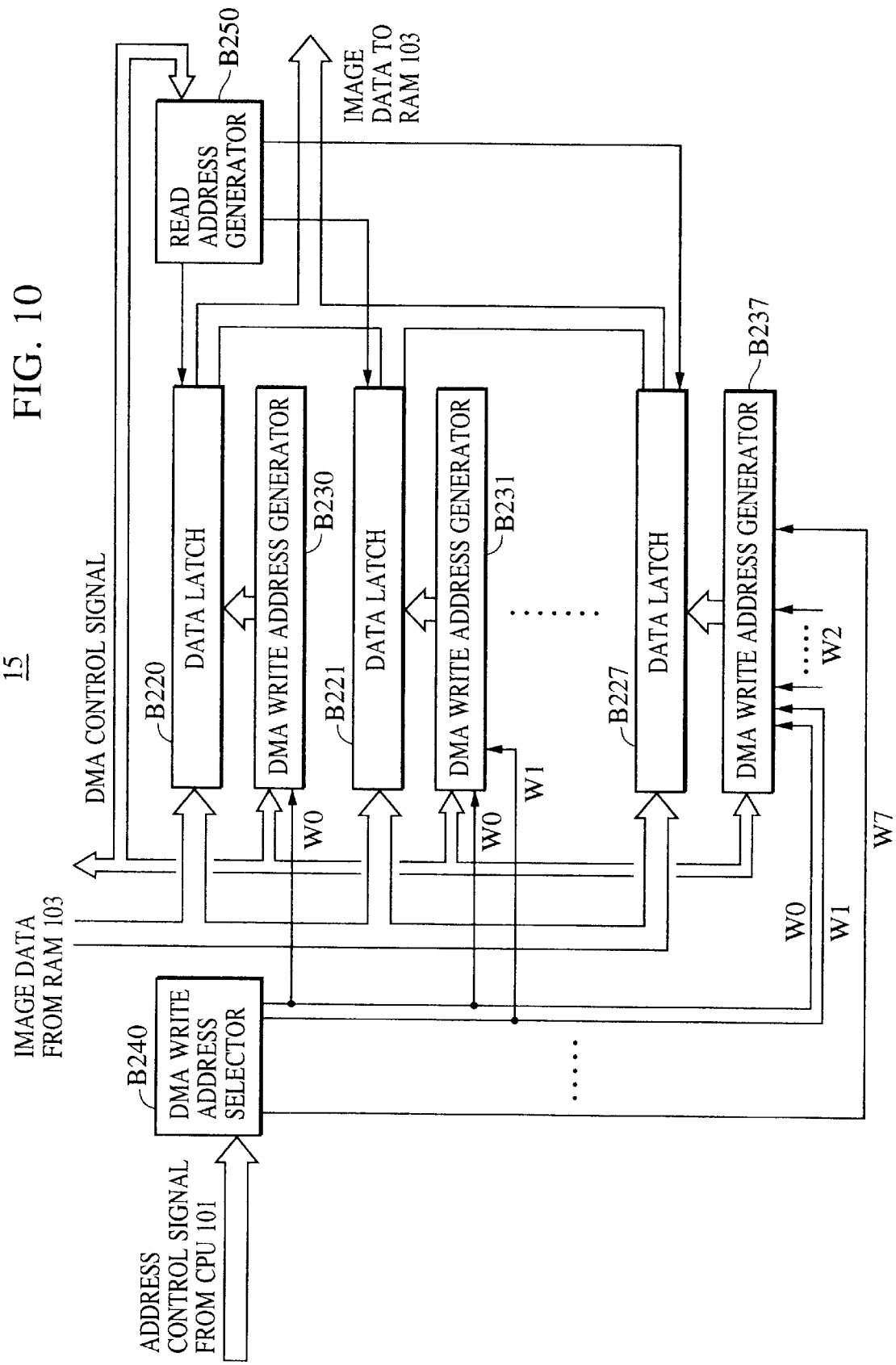
FIG. 10 is a block diagram of the functional configuration of the H-V converting section according to a second embodiment of the present invention.

FIG. 10 is a block diagram of the functional construction of the H-V converting section 115. In this embodiment, the image data for one line stored in the zone b of the RAM 103 is transferred to the H-V converting section 115 by means of DMA. Referring to FIG. 10, the H-V converting section 115 includes eight data latches B220 to B227, each being capable of latching image data for one line, and also includes DMA write address generators B230 to B237, corresponding to the data latches B220 to B227, respectively, for generating write addresses required for DMA transfer and controlling DMA transfer. Further, a DMA write address selector B240 selectively outputs eight trigger signals W0 to W7 at "H" according to the control signal supplied from the CPU 101 and causes the data latches that have received the write trigger signals at "H" to latch the transferred image data. A DMA read address generator B250 generates a reading address for causing the data latches B220 to B227 to read the image data by a unit of eight bits by one bit, thereby controlling the DMA transfer operation. The arrangement of the image data in this embodiment is similar to that of the first embodiment shown in FIG. 3.

Referring to FIG. 10, the image data at the respective lines stored in the zone b of the RAM 103 is transferred to the H-V converting section 115 and further supplied to the specified addresses of the data latches according to the write addresses generated by the DMA write address generators B230 to B237. The write address generators B230 to B237 generate the corresponding write addresses based on the DMA control signal and the data-latching write enable signals, i.e., the write trigger signals W0 to W7, generated according to the number of the line copying operations. For example, in the above-described H-V converting section 115, when the image data at the first line shown in FIG. 3 is copied one time; the image data at the second line is copied two times; and the image data at the third line is copied two times, in a manner similar to the first embodiment, the image data is latched: only the write trigger signal W0 is set at "H" during the DMA transfer operation at the first line; only the signal W2 is set at "H" during the DMA transfer operation at the second line; and only the signal W5 is set at "H" during the DMA transfer operation at the third line.

After the image data (8 lines by the number of main-scanning bits) is stored in all the data latches, the DMA read address is generated by the DMA read address generator B250 based on the DMA control signal, so that the image data is sequentially read from the pixels located in the same position along the line in the respective data latches. The image data is then stored by 8 bytes in the zone c of the RAM 103. The DMA transfer operation is thus completed.

As has been discussed above, according to the second embodiment, DMA transfer is employed so that the image data can be transferred to the H-V converting section 115 from the zone b of the RAM 103 without the need for CPU 101 intervention. Also, data latches are provided for latching the image data for one line, which enables the transfer operation by a unit of line, thereby implementing more efficient resolution conversion. As a result, resolution conversion and H-V conversion can be performed at higher rate over the first embodiment, which reduces a load for the CPU 101 and also enhances the total throughput of the facsimile machine.

In this embodiments, the ink jet head has 64 nozzles, but this is not exclusive. The present invention is readily applicable to recording apparatuses having a different number of nozzles, which may be modified by, for example, disposing latch circuits according to the number of nozzles or changing the storage addresses.

The recording apparatuses of the first and second embodiments have means for generating thermal energy (for example, an electrothermal transducer, a laser beam or the like) which is used to cause a change of state of the ink to eject the ink. According to this recording method, the higher density of pixels and the higher definition of recording are possible.

The typical structure and the operational principle of such apparatuses are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet.

The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination (linear liquid passage or right-angle liquid passage) of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure waves of the thermal energy is formed corresponding to the ejecting portion.

Moreover, the present invention is effectively applicable to a full-line type recording head having a length corresponding to the greatest-possible width of a recording medium that can be recorded by the recording apparatus. For satisfying such a length, a plurality of recording heads may be combined or may be integrally formed into a single head.

In addition, the present invention is applicable to a serial type recording head wherein the recording head is fixed on the main assembly, to a replaceable chip type recording head which is connected electrically with the main apparatus and which can be supplied with the ink when it is mounted in the main assembly, or to a cartridge type recording head having an integral ink container.

The provisions of recovery means and/or auxiliary means for the preliminary operation are preferable, because they can further stabilize the effects of the present invention. Examples of such means include a capping means for the recording head, cleaning means therefor, pressurizing or suction means, and preliminary heating means, which may be the electrothermal transducer, an additional heating element or a combination thereof. Also, means for effecting preliminary ejection (not for the recording operation) can stabilize the recording operation.

Furthermore, in the first and second embodiments, the ink has been liquid. It may be ink material which is solid at room temperature or lower or liquid at room temperature or lower. Since the ink is kept within a temperature between 30° C. and 70° C., in order to stabilize the viscosity of the ink to provide the stabilized ejection in the usual recording apparatus of this type, the ink may be such that it is liquid within the temperature range when the recording signal is applied. The present invention is also applicable to other types of ink. In one of them, the temperature rise due to the thermal energy is positively prevented by consuming it for the state change of the ink from the solid state to the liquid state. Another ink material is solidified when it is left unused, and is liquefied when heated, to prevent the evaporation of the ink. In either of the cases, in response to the application of the recording signal producing thermal energy, the ink is liquefied, and the liquefied ink may be ejected. Another ink material may start to be solidified at the time when it reaches the recording material.

The present invention is also applicable to such, an ink material as is liquefied by the application of the thermal energy. Such an ink material may be retained as a liquid or solid material in through holes or recesses formed in a porous sheet as disclosed in Japanese Laid-Open Patent Application No. 54-56897 and Japanese Laid-Open Patent Application No. 60-71260. The sheet may be faced to the electrothermal transducers. The most effective one of the techniques applicable for the above-described types of ink is the film boiling system.

The recording apparatus of the present invention may be used as an image output terminal disposed integrally with or separately from an information processing apparatus, such as a computer or the like, and may be used as a copying apparatus combined with an image reader or the like. The invention is also applicable to a system formed of a plurality of apparatuses, such as a host computer, an interface, a printer and so on, or to a facsimile machine formed of a single apparatus. Further, the invention may be implemented by supplying a program stored in a storage medium of a system or an apparatus. In such a case, a recording medium storing the above-mentioned program may be one of the features of the present invention. The program may be read from the storage medium to the system or the apparatus, which may be then operable in a predetermined manner.

As will be clearly understood from the foregoing description, the present invention offers the following advantages.

The data arrangement in the horizontal and vertical directions is reversed while conducting resolution conversion on the data along the line. Accordingly, substantially simultaneous conversion, such as resolution conversion in the sub-scanning direction and horizontal-vertical conversion of the image data, can be achieved. As a result, total throughput of the apparatus can be improved.

Additionally, only first and second storage means are required for input/output and storage of the data in order to execute the above-described conversion processing. Accordingly, only a small capacity of memory is necessary for storing the image data, thus contributing to a decrease in the size of the apparatus and costs.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image recording apparatus having recording means that performs a recording operation while scanning received image data by a recording head, said apparatus comprising:

conversion means for converting pixel density of said received image data at each line according to a resolution of said recording in a main-scanning direction;

first storage means for storing the received image data whose resolution is converted by said conversion means;

processing means for collectively performing a process for converting the resolution of the image data in sub-scanning direction at each predetermined length according to the resolution of said recording head in the sub-scanning direction and a process for converting a horizontal and vertical arrangement of the image data whose resolution is converted in the sub-scanning direction, by inputting a plurality of predetermined length of image data corresponding to a plurality of lines, which are read out from said first storage means, wherein said predetermined length is shorter than a length of image data corresponding to one line; and second storage means for storing the image data processed by said processing means, wherein said recording means performs a recording operation in accordance with the image data stored in said second storage means.

2. An image recording apparatus according to claim 1, wherein said second storage means has a capacity for storing image data required for one or two scanning operations to be performed by said recording means.

3. An image recording apparatus according to claim 1, further comprising recording-control means for controlling the recording operation performed by said recording means while executing double-buffering control over said second storage means.

4. An image recording apparatus according to claim 1, wherein the pixel number of the data stored in said second storage means by said control means is larger than the pixel number of the data read from said first storage means.

5. An image recording apparatus according to claim 1, wherein said conversion means performs resolution conversion according to the ratio of the pixel density of the received image data per line to the resolution of said recording head.

6. An image recording apparatus according to claim 1, wherein said second conversion means performs resolution conversion according to the ratio of the resolution of said received image data in the sub-scanning direction to the resolution of said recording head.

7. An image recording apparatus according to claim 1, wherein said recording head is an ink-jet recording head for performing a recording operation by ejecting ink.

8. An image recording apparatus according to claim 1, wherein said recording head is a recording head that ejects ink by use of thermal energy and comprises an electrothermal transducer for generating thermal energy to be applied to ink.

9. A data conversion apparatus for rearranging a predetermined amount of image data in the horizontal direction and outputting the image data by said predetermined amount in the vertical direction, said apparatus comprising:

a plurality of storage means for storing the image data in the horizontal direction;

selection means for selecting from said plurality of storage means a storage means for storing said image data in the horizontal direction, said selection means being capable of selecting a plurality of storage means at the same time;

generation means for generating a signal for causing the storage means selected by said selection means to store said image data in the horizontal direction; and output means for outputting the image data in the vertical direction by said predetermined amount according to the image data stored in said plurality of storage means.

10. A data conversion apparatus for converting a horizontal and vertical arrangement of image data, said apparatus comprising:

a plurality of storage means for storing a predetermined amount of image data in a horizontal direction;

selection means for selecting from said plurality of storage means a storage means for storing said predetermined amount of image data, said selection means selecting a plurality of storage means at a same time, wherein a same image data is stored in said storage means selected at the same time by said selection means;

generation means for generating a signal for causing the storage means selected by said selection means to store said image data in the horizontal direction; and output means for outputting the image data in the vertical direction according to the image data stored in said plurality of storage means.

11. An image recording apparatus having recording means that performs a recording operation while scanning received image data by a recording head, said apparatus comprising:

first conversion means for converting the pixel density of said received image data at each line to the resolution of said recording means in the main-scanning direction;

first storage means for storing the received image data whose resolution is converted by said first conversion means;

second conversion means for reading a predetermined length of the resolution-converted image data stored in said first storage means so as to convert the resolution of said data in the sub-scanning direction to the resolution of said recording means in the sub-scanning direction;

second storage means for storing the image data whose resolution is converted by said second conversion means; and control means for reversing the horizontal and vertical arrangement of the image data while performing resolution conversion by said second conversion means.

12. A data conversion apparatus according to claim 10, wherein said selection means comprises address means for generating addresses for said plurality of storage means, and upon generating an address by said address means, said selection means selects the storage means corresponding to the generated address and subsequent addresses so as to store said image data in the horizontal direction in the selected storage means.

13. A data conversion apparatus for converting the horizontal and vertical arrangement of image data, comprising:

storage means for storing line image data; and processing means for collectively performing a process for converting a resolution of the image data in a sub-scanning direction at each predetermined length according to a resolution of said recording means in a sub-scanning direction, and a process for converting the horizontal and vertical arrangement of the image data whose resolution is converted in the sub-scanning direction, by inputting a plurality of predetermined length of image data corresponding to a plurality of lines, which are read out from said storage means, wherein said predetermine length is shorter than a length of image data corresponding to one line.

14. A data conversion apparatus according to claim 13 wherein said processing means comprises:

a plurality of memory means for storing said predetermined length of image data;

designation means for designating memory means for storing the same predetermined length of image data;

means for causing said plurality of memory means to store said predetermined length of image data in accordance with the designation of said designating means; and output means for outputting image data in a vertical direction from said plurality of memory means.

15. A data conversion apparatus according to claim 14, wherein said designation means comprises address means for generating addresses for said plurality of memory means, and upon generating an address by said address means, said designation means designates a memory means corresponding to the generated address and subsequent addresses so as to store the same predetermined length of data in the designated memory means.

* * * * *

UNITED STATES PATENT AND TRADEMARK OFFICE
CERTIFICATE OF CORRECTION

PATENT NO. : 5,870,536

DATED : February 9, 1999

INVENTOR(S) : YUJI KUROSAWA

Page 1 of 3

It is certified that error appears in the above-identified patent and that said Letters Patent is hereby corrected as shown below:

<u>ON TITLE PAGE</u>
  [57] Abstract "After the image" should read --Image--.

<u>COLUMN 1</u> line 21, "direction)," should read --direction"),--;
  line 23, "direction)." should read --direction")._--;
  line 34, "conversion)." should read --conversion").--;
  line 66, "size" should read --size and cost--; and
          and "apparatus and" should read --apparatus.--;
          and
  line 67, "costs." should be deleted.

<u>COLUMN 3</u> line 12, "sensor"." should read --sensor").--;
  line 18, "stand-by" should read --standby--; and
  line 49, "method.)" should read --method").--

<u>COLUMN 5</u> line 9, "an" should read --a--; and
  line 14, "section 12," should read --section 112,--.

UNITED STATES PATENT AND TRADEMARK OFFICE
CERTIFICATE OF CORRECTION

PATENT NO. : 5,870,536

DATED : February 9, 1999

INVENTOR(S) : YUJI KUROSAWA

It is certified that error appears in the above-identified patent and that said Letters Patent is hereby corrected as shown below:

COLUMN 11 line 43, "512nd" should read --512th--; and
line 49, "513rd" should read --513th--.

COLUMN 14 line 46, "512nd" should read --512th--; and
line 52, "513rd" should read --513th--.

COLUMN 15 line 15, "explained" should read --described.--; and
line 18, "preformed" should read --performed--.

COLUMN 16 line 16, "embodiments" should read --embodiment--.

COLUMN 17 line 45, "such," should read --such--.

UNITED STATES PATENT AND TRADEMARK OFFICE
CERTIFICATE OF CORRECTION

PATENT NO. : 5,870,536

DATED : February 9, 1999

INVENTOR(S) : YUJI KUROSAWA

It is certified that error appears in the above-identified patent and that said Letters Patent is hereby corrected as shown below:

COLUMN 18 line 41, "sub-scanning" should read --a sub-scanning--.

COLUMN 20 line 39, "predetermine" should read --predetermined----; and line 41, "claim 13" should read --claim 13,--.

Signed and Sealed this

Fourth Day of January, 2000

Attest:

Attesting Officer

Acting Commissioner of Patents and Trademarks